US005506453A

United States Patent [19]
McCombs

[11] Patent Number: 5,506,453
[45] Date of Patent: Apr. 9, 1996

[54] MACHINE FOR CONVERTING WIND ENERGY TO ELECTRICAL ENERGY

[76] Inventor: John C. McCombs, 1215 Clearview Dr., Port Charlotte, Fla. 33953

[21] Appl. No.: 809,965

[22] Filed: Dec. 18, 1991

Related U.S. Application Data

[63] Continuation-in-part of Ser. No. 477,537, Feb. 9, 1990, abandoned.

[51] Int. Cl.$^6$ .............................. H02P 9/04; F03B 13/00; F03D 9/00
[52] U.S. Cl. .................................. 290/44; 290/54; 290/55
[58] Field of Search ........................................ 290/44, 55

[56] References Cited

U.S. PATENT DOCUMENTS

| | | | |
|---|---|---|---|
| 1,533,467 | 4/1925 | Sargent | 290/55 |
| 2,153,523 | 4/1939 | Roberts et al. | 290/55 |
| 2,237,857 | 4/1941 | Winderl | 290/44 |
| 2,358,781 | 9/1944 | Albers | 290/44 |
| 4,039,848 | 8/1977 | Winderl | 290/55 |
| 4,213,057 | 7/1980 | Are | 290/44 |

OTHER PUBLICATIONS

G. W. Koeppl, "Putnam's Power from the Wind," 1982, pp. 113–114.
"Alternator Secrets," Lindsay Publications, Inc., 1977.

Primary Examiner—Steven L. Stephan
Assistant Examiner—Christopher Cuneo

[57] ABSTRACT

A machine for converting wind energy into electrical energy comprising in combination a housing; propellers at the forward and rearward ends of the housing mounted on shafts for rotation upon a common horizontal axis of rotation; post means supporting a central extent of the housing for rotation in a horizontal plane to face into the wind; an alternator within the housing formed of a power take off member coupled to one shaft and a rotor coupled to another shaft for counter rotating when the propellers rotate for thereby generating electricity; centrifugal pitch control mechanisms for varying the pitch of the propellers as a function of the propeller speed; transmission mechanisms for varying the speed of rotation of the rotor and power take off member as a function of the wind speed; brake mechanisms for proportionately restraining the propellers against rotation; and an aerogovernor operatively coupled with the brake mechanisms for control thereof in response to the speed of the wind as determined by the aerogovernor.

5 Claims, 6 Drawing Sheets

MACHINE FOR CONVERTING WIND ENERGY TO ELECTRICAL ENERGY

This is a continuation-in-part of application Ser. No. 07/477,537 filed Feb. 9, 1990, now abandoned.

BACKGROUND OF THE INVENTION

SUMMARY OF THE INVENTION

This invention relates to a machine for converting wind energy to electrical energy and, more particularly, to a machine with two wind driven propellers for counter rotating the rotor and power generator housing of an alternator.

DESCRIPTION OF THE BACKGROUND ART

Electrical power is presently produced through various techniques. The most common technique is the combustion of fossil fuels, such as coal and oil, to create steam which turns turbines for driving electric generators or dynamos. The products of combustion of fossil fuels, however, are pollutants. Such pollutants are now concentrated in the air of our major cities and are diffusing throughout the air of our planet. Such pollutants include poisons such as sulfates, nitrates, carbon oxides, etc. Electric power is also produced by atomic plants. Such plants, however, generate nuclear waste which is inherently dangerous and, in addition, present a serious storage problem. This leaves hydroelectric, solar, geothermal, tidal, and wind as alternate energy sources which are environmentally clean and not inherently dangerous.

One alternate energy source which is particularly promising are wind farms which are presently in use but only on a limited basis. Known windmills are generally very large and expensive. Smaller relatively inexpensive units if of advanced, more efficient, designs could provide more energy per land area, especially if utilized on a national or worldwide scale. Such units could be utilized individually or connected to existing utility power grids, whether atomic or fossil.

Various techniques are employed commercially or are disclosed in the patent literature for converting wind energy to electrical energy. Note, for example, U.S. Pat. Nos. 4,066,911 to Sarchet; 4,171,491 to Theyse; 4,186,312 to Dvorak; 4,291,233 to Kirschbaum; 4,291,235 to Bergey; 4,316,096 to Syverson; 4,357,542 to Kirschbaum; 4,435,646 to Coleman; 4,446,376 to Baker; 4,461,957 to Jallen; 4,447,738 to Allison; 4,535,252 to Jacobs; 4,565,929 to Baskin; 4,673,822 to Kikuchi; 4,695,736 to Doman; and 4,703,189 to DiValentin. All of these patents convert wind energy to electrical energy by a single propeller with blades rotatable in a plane around a horizontal axis. All are of marginal efficiency since they utilize a dynamo or generator with a fixed power take off member and a rotatable rotor for converting wind power to direct current electrical power. Note is also taken of U.S. Pat. No. 4,449,053 to Kutcher. Kutcher is similar to the above listed patents but utilizes a vertical axis about which its propeller rotates. Lastly, U.S. Pat. Nos. 4,213,057 to Are and 4,345,161 to Crompton disclose two sets of blades counter rotating about a horizontal axis for rotating both a rotor and stator. The rotor and stator constitute a dynamo or generator for converting wind energy to direct current electrical energy.

As illustrated by the great number of prior patents as well as commercial devices and techniques, efforts are continuously being made in an attempt to improve devices for converting wind energy to electrical energy. Such efforts are being made to render such devices more efficient, reliable, inexpensive and convenient to use. None of these previous efforts, however, provides the benefits attendant with the present invention. Additionally, the prior patent and commercial devices and techniques do not suggest the present inventive combination of component elements arranged and configured as disclosed and claimed herein.

The present invention achieves its intended purposes, objects and advantages through a new, useful and unobvious combination of component elements, with the use of a minimum number of functioning parts, at a reasonable cost to manufacture, and by employing only readily available materials.

Therefore, it is an object of this invention to provide an improved machine for converting wind energy into electrical energy comprising in combination a housing; propellers at the forward and rearward ends of the housing mounted on shafts for rotation upon a common horizontal axis of rotation; post means supporting a central extent of the housing for rotation in a horizontal plane to face into the wind; an alternator within the housing formed of a power generator housing coupled to one of the shafts and a rotor coupled to another shaft for counter rotating when the propellers rotate for thereby generating electricity; centrifugal pitch control mechanisms for varying the pitch of the propellers as a function of the wind speed; transmission mechanism for varying the speed of rotation of the rotor and power generator housing as a function of the wind speed; brake mechanisms for proportionately restraining the propellers against rotation; and an aerogovernor operatively coupled with the brake mechanisms for control thereof in response to the speed of the wind as determined by the aerogovernor.

It is a further object of this invention to convert wind energy to electrical energy by counter rotating blades of a wind driven machine to thereby counter rotate the rotor and the power generator housing of an alternator.

It is a further object of the present invention to more efficiently utilize the rotating blades of a wind conversion machine in producing electricity.

Lastly, it is an object of the invention to automatically control the operating parameters of a wind conversion machine as a function of the wind speed.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved machine for converting wind energy into electrical energy comprising in combination a housing; propellers at the forward and rearward ends of the housing mounted on shafts for rotation upon a common horizontal axis of rotation; post means supporting a central extent of the housing for rotation in a horizontal plane to face into the wind; an alternator within the housing formed of a power generator housing coupled to one of the shafts and a rotor coupled to another shaft for counter rotating when the propellers rotate for thereby generating electricity; centrifugal pitch control mechanisms for varying the pitch of the propellers as a function of the propeller speed; transmission mechanisms for varying the speed of rotation of the rotor and power generator housing as a function of the wind speed; brake mechanisms for proportionately restraining the propellers against over rotation; and an aerogovernor operatively coupled with the brake mechanisms for control thereof in response to the speed of the wind as determined by the aerogovernor.

The machine further includes trigger means coupling the aerogovernor and pitch control mechanisms for full feathering of the propellers in response to a excessively high wind condition. The machine further includes manual control means for energizing the brake mechanisms as for maintenance and repairs.

The invention may also be incorporated into a machine for converting wind energy into alternating current comprising in combination a housing; propellers at the forward and rearward ends of the housing mounted on shafts for rotation upon a common horizontal axis of rotation; an alternator within the housing formed of a power take off member and a rotor coupled to the prop shafts for counter rotating when the propellers rotate for generating alternating current; electrical convertor or power pack 228 for converting direct current to alternating current or whatever current desired; control mechanisms for varying the operating chartertistics of the machine; and an aerogovernor operatively coupled with the control mechanisms for varying the speed of the propellers in response to the speed of the wind. The control mechanisms include a brake mechanism and the aerogovernor is coupled thereto by a hydraulic line for the proportional braking in response to the wind speed. The machine further includes additional control means under the control of an operator for locking the brake mechanisms to preclude propeller rotation as for maintenance and repairs. The control mechanisms include a centrifugal control operable in response to the speed of propeller rotation to proportionately engage/feather the propellers and modify their rotational speed in response to changes in wind speed. The machine further includes additional control means operable in response to excessive rotation of the aerogovernor for full feathering of the propellers in response to a excessively high wind condition. The control mechanisms includes a transmission mechanism operable in response to the speed and torque of propeller rotation to proportionally vary the speed of rotation of the rotor and power generator housing and and thereby maintain their speeds within a predetermined optimal range. The leeward propeller is of a larger diameter than the windward propeller. The invention also includes a fin on the leeward half of the housing in a vertical plane and a support post which couples with the windward half of the housing to orient the housing into the wind.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention, it should be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which.

Similar reference characters refer to similar parts throughout the several Figures.

DETAILED DESCRIPTION OF THE INVENTION

Overview

Figure 1:
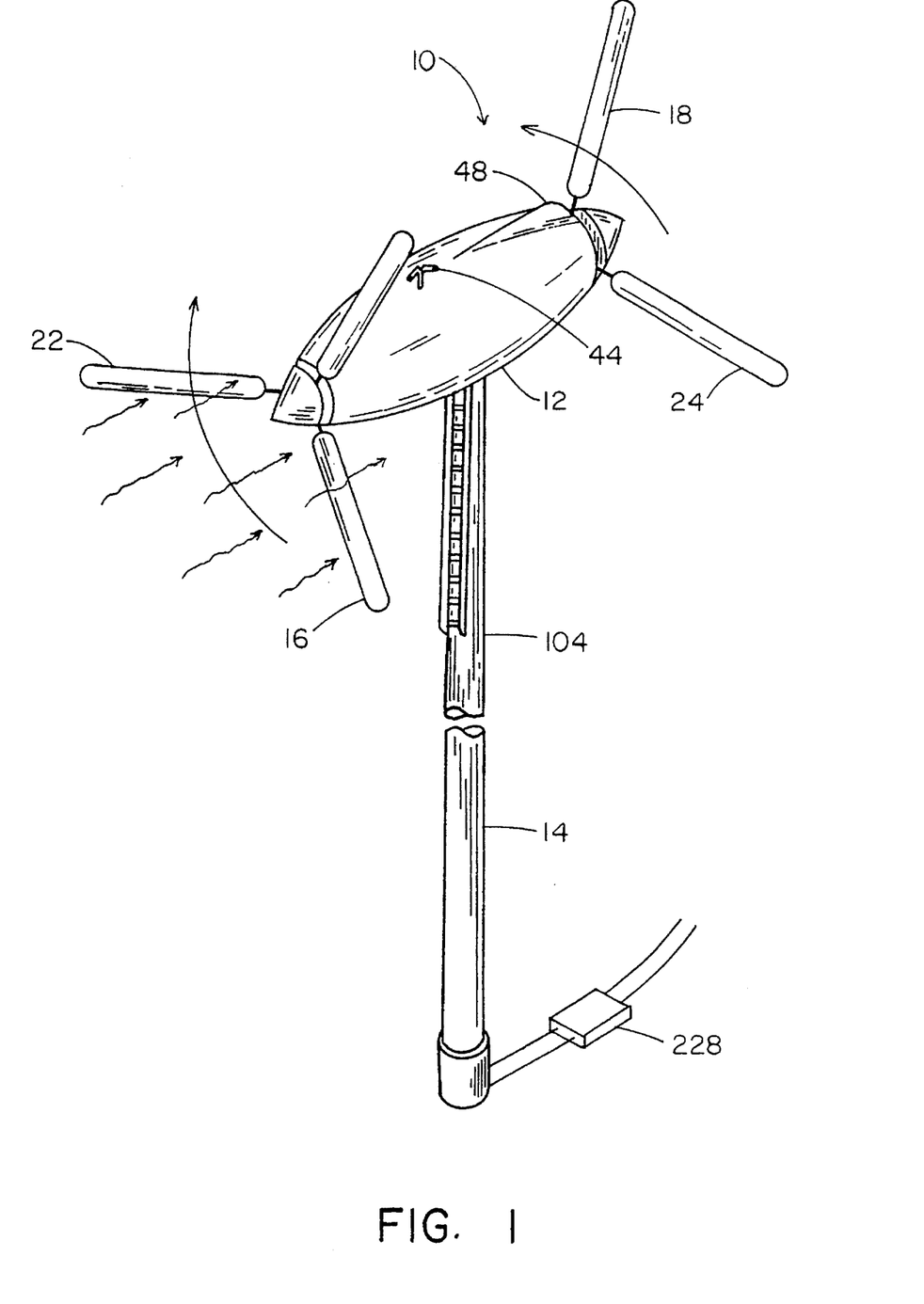
FIG. 1 is a perspective illustration of a wind conversion machine constructed in accordance with the principles of the present invention.

There is shown in FIG. 1 a perspective illustration of a machine 10 for converting wind energy to electrical energy constructed in accordance with the principles of the present invention. The machine includes a main housing 12 supported at an elevated location for being driven by the wind. Support of the housing is by a post 14 secured at its lower end to the ground and with its upper end pivotally supporting the machine housing. At opposite ends of the housing are a front or windward propeller 16 and a rear or leeward propeller 18. Each propeller is independently rotatable under the force of the wind. The internal mechanisms within the housing function to convert the rotation of the propellers as caused by the wind into electrical energy which is transmitted from the housing to exterior of the machine via slip rings, spring loaded carbon brushes, and wires to electrical converter or power pack 228 to power lines 20.

Each propeller is formed of one or more blades 22 and 24. In the preferred embodiment as shown, three such blades are utilized for each propeller. The blades are equally spaced at 120 degrees around a common axis extending essentially horizontally through the horizontal center of the housing. Any number of equally spaced blades could be readily utilized as a function of the particular application. In addition, the front blades 22 in this embodiment are about 5 feet in length, the rear blades 24 are about 20 percent larger, about 6 feet in length so as to be more positively driven by the wind and to assist in proper directional orientation of the housing. Such lengths are also a function of the particular application.

In association with the housing are a plurality of other control mechanisms including (a) the prop shafts 26 and 28 and associated mechanisms which couple the rotating mechanical propellers 16 and 18 with the electricity generating mechanisms 30; (b) the braking mechanisms 32 for proportionately reducing the speed of the propellers or to reduce their speed to zero either automatically under high wind conditions or manually for the purposes of maintenance or repair; (c) the transmission mechanisms 34 for converting the rotation of the prop shafts 26 and 28 to rotation of aligned electrical shafts 36 and 38 for rotating the electricity generating mechanisms 30 and for controlling the rotational speeds therebetween; (d) the blade pitch control or feathering mechanisms 42 for varying the pitch of the propellers through centrifugal controls as a function of the wind speed to optimize the operating parameters during use; and (e) the aerogovernor 44 for determining wind speed and, in response thereto, for altering the orientation of the braking mechanisms 32 proportionately as a function of wind speed and for altering the orientation of the feathering mechanisms 42 as an override 164 for its centrifugal controls.

Housing

Figure 2:
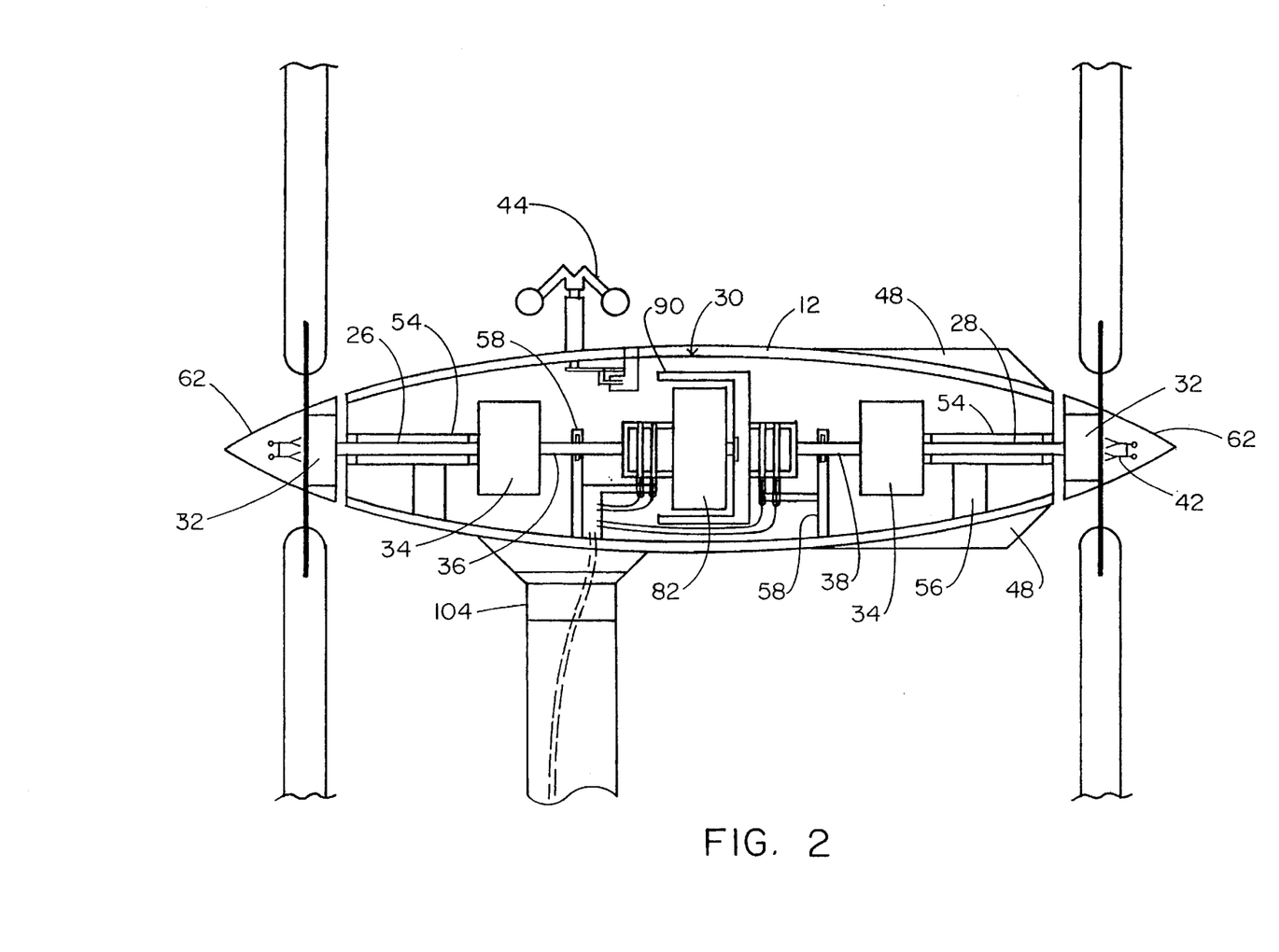
FIG. 2 is a side elevational view, partly in section, showing various internal components of the machine of FIG. 1.

With more particular reference to FIG. 2, there is shown the housing mechanism 12 or fuselage for covering the majority of the operating mechanisms of the machine. The housing 12, like the support post 14, is fabricated of steel although any wear-resistant rigid material could be readily utilized. The material selected is also weather-resistant in the event of inclemency or high wind conditions. The machine is intended for use over long periods of time with little or no operator involvement.

The shape of the housing is aerodynamic to create a laminar airflow therearound with minimum wind resistance. This will maximize the propeller speed. One or more vertical fins 48 adjacent the rear end of the housing will help to orient the machine facing into the direction of the wind. The largest diameter propeller is located closer to the rear end of the housing as compared with the front end for increased efficiency and directional purposes.

Located along the central axis of the housing are the propeller shafts 26 and 28, the electrical support shafts 36 and 38, as well as the rotor 82 and power generator housing 90 for the generation of electricity. The propeller shafts 26 and 28 are encased within shaft support tubes 54 which house bearings to support rotation of the propeller shafts 26 and 28. They are retained in their horizontal orientations by supports 56 extending upwardly from the bottom of the housing 12.

Transmission mechanisms 34 couple the axially interior ends of the prop shafts 26 and 28 with the axially exterior ends of the electrical shafts 36 and 38. Vertical supports 58 extend upwardly from the bottom of the housing with bearings at their upper ends for rotationally supporting the electrical shafts and alternator 30. The rotor 82 and power generator housing 90 are at the axial interior ends of the electrical shafts 36 and 38. Also centrally disposed along the axis are the braking mechanisms 32 at the axially exterior ends of the prop shafts 26 and 28.

At the axially exterior ends of the housing are rotatable spinners 62 mounted for rotation with the propeller and the shafts 26 and 28. Within the spinners 62 are the propeller blade pitch control mechanisms 42. These mechanisms and their mode of operation are disclosed in greater detail hereinafter.

The entire housing is supported on the fixed support post 14 which is formed with an upwardly projecting cylindrical finger or spindle 66 receiving a cylindrical recess or hub 68 formed in the bottom of the housing at or adjacent to its center of gravity. This allows for free and efficient rotation of the housing and propeller blades into the wind for maximum efficiency during operation and use.

Figure 3:
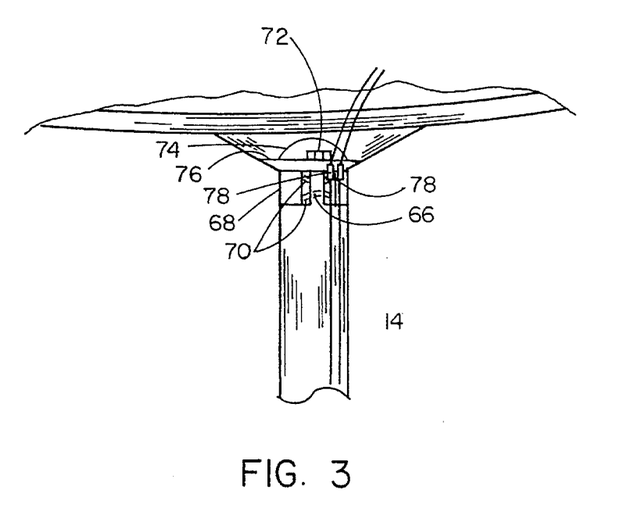
FIG. 3 is an elevational view of the tower top pivot as shown in FIGS. 1 and 2.

FIG. 3 illustrates the tower top pivot. A hub 68 and spindle 66 is supported atop a steel pipe tower or post 14. The hub contains two roller bearings 70 which allow free rotation of the machine, whereby it may weathervane into the wind. A nut 72 retains the hub on the spindle and a dustcover 74 prevents bearing contamination from the weather. The framework bolts onto the hub. A hub slip disc 76 contacts connector brushes 78 for electrical continuity.

Alternator

A dynamo is a rotating machine used to convert mechanical energy into electrical energy. The term "dynamo" was once used to cover both direct current (DC) generators and alternating current (AC) generators which are today more commonly called alternators. The alternator as well as the generator both make use of the principle that when an electrical conductor is moved through the field of a magnet, a voltage drop is created or induced along the length of the conductor. If the ends of the conductor are connected in a closed electrical circuit, a voltage or electrical pressure is induced in the conductor which causes a current to flow through the conductor and circuit. Mechanical energy has thus been converted into electrical energy.

The current from the generator flows in the same direction at all times. From the alternator, the current changes direction at a constant rate in the form of a sine wave. An alternating current rises to a peak value, falls to zero, rises to a peak in the opposite direction and then falls to zero again. This cycle is repeated 60 times per second in a typical power station alternator.

Figure 5:
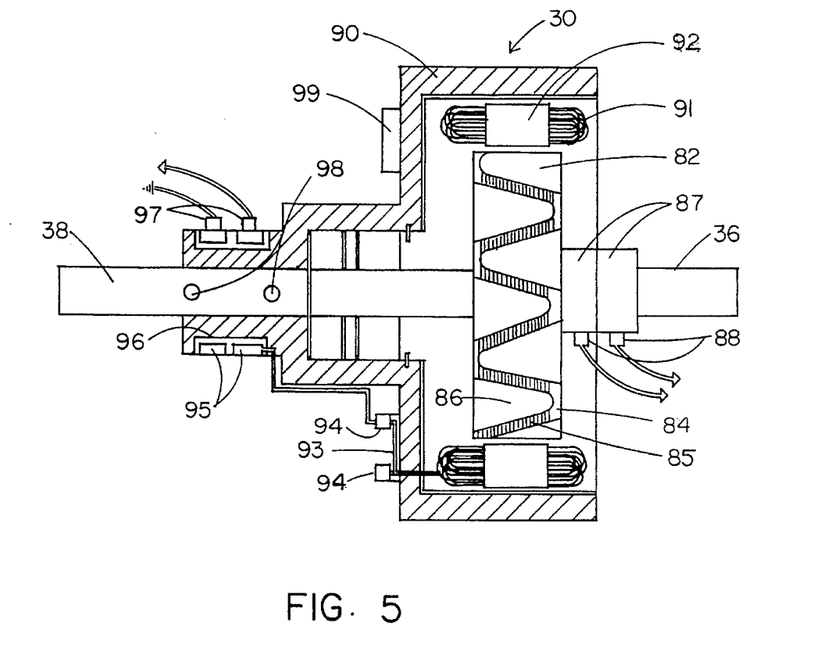
FIG. 5 is a sectional view of the alternator as shown in FIG. 2.

The electricity generating mechanisms or alternator 30 of the machine of the present invention is shown in FIGS. 5 which illustrate an arrangement of a typical alternator as preferably utilized in the present invention. The central rotor 82 functions as an electromagnet to create an electromagnetic field. A central iron core 84 is wound with an electrical wire 85 in a loop configuration. The core 84 and wire 85 are covered partially with pole faces 86 in a cylindrical configuration. These pole faces act as north or south pole faces on one side of the coil winding 85 and the contralateral pole faces act as the respective opposing pole faces creating multiple alternate N-S-N-S . . . pole faces that induce current in windings 91. The wire is coupled at its ends to slip rings 87 with brushes 88 to provide current to the wire for generating the electromagnetic field about the rotor. In a cylindrical orientation around the rotor is a power generator housing 90 having a series of windings 91 laced through perforations in a laminated iron core ring 92 forming a series of coils to draw an electron flow. When the power generator housing 90 moves its windings through the electromagnetic field of the rotor, electrical current is generated in the windings. The winding ends are coupled through a wire 93 and a plurality of diodes 94 to a pair of coaxial slip rings 95 mounted in an electrically insulating cylinder 96 which collects current from the windings. The output current of the windings is removed from the wire loops through the two slip rings 9S which rotate against brushes 97 which are conventionally spring loaded carbon blocks. One of the rings is preferably a ground. Wires connect the alternator brushes 97 to the hub slip disc 76. The direction of current flow depends on which way each half of the wire loops are cutting the magnetic lines of force. As each half descends across the face of a north pole of a magnet, the current will flow in one direction. The current will flow in the opposite direction when a loop moves upward over the face of a south pole of a magnet. A pair of pins 98 couple the power generator housing to its supporting shaft 38. A counterweight 99 is located on the power generator housing diametrically opposed to the diodes. Conventional bearings allow unrestricted counterrotation of the rotor and power generator housing.

The alternating current produced is rectified into direct current by diodes 94. The direct current may then be inverted and synchronized by the power pack 228 which would provide alternating current electrical power output that is synchronized with the electrical power system, for example, the public utility. The direct current may also be stored in batteries and used either with or without conjunction of the power pack depending upon the particular application intended.

The rotor is preferably of the type disclosed in Alternator Secrets, copyright 1977, 1986 Lindsay Publications Inc., P.O. Box 12, Bradley Ill. 60915. The power generator housing is preferably of the type employed commercially in Chrysler Imperial automobiles in the mid 1970's, except that the present device is mounted for rotation. Such members produce 100 amps.

Brake Mechanism

Shown in the FIG. 2 sectional view of the machine of the present invention is a brake 32. The brake has the function of automatically stopping the rotation of the propellers 16 and 18, prop shafts 26 and 28, electrical shafts 36 and 38, and generating mechanisms 30 in the event of excessively high winds. In the alternative, stoppage may be effected at the discretion of an operator as for maintenance and repair purposes. The brake 32 is shown schematically between the propellers and propeller shaft. Actually, there is a separate brake 32 between each propeller 16 and 18 and its associated prop shaft 26 and 28.

A brake is a staple item of commerce used to stop the movement of a rotating member. A wide variety of types of brakes are in commercial use today. In its simplest forms as employed herein, a shoe fixedly pivoted to the housing is moved axially or a lining is moved radially with respect to the rotating member to be acted upon. Motion of the shoe or lining into contact with the rotating mechanism will effect its slowdown and eventual stoppage when forces are applied to move the shoe or lining into frictional contact with the rotating member.

A wide variety of commercial or otherwise known brakes could be utilized in the instant application. The preferred type is a pair of static frictional linings on opposite sides within a drum revolving with the propellers. The linings are made to move apart by forces generated manually at the discretion of an operator through the cable brake maintenance shutdown system 100 of FIG. 6 or by forces generated in response to the aerogovernor 44 revolving at a sufficienty high speed as a result of excessive wind forces. Without the manual cable brake maintenance shutdown system 100, the machine of the present invention would be difficult to repaired or provided with regular preventive maintenance unless it was in a zero wind condition. Similarly, without the automatic braking control through the aerogovernor 44, high winds could cause excessively rapid rotation of the propellers 16 and 18 and self destroy the machine of the present invention. The automatic braking is proportional to the wind speed and is controlled by the spring 102. Different parameters may be attained by varying the spring to provide different coefficients of restitution or by other conventional spring varying mechanisms known in the mechanical arts.

Figure 6:
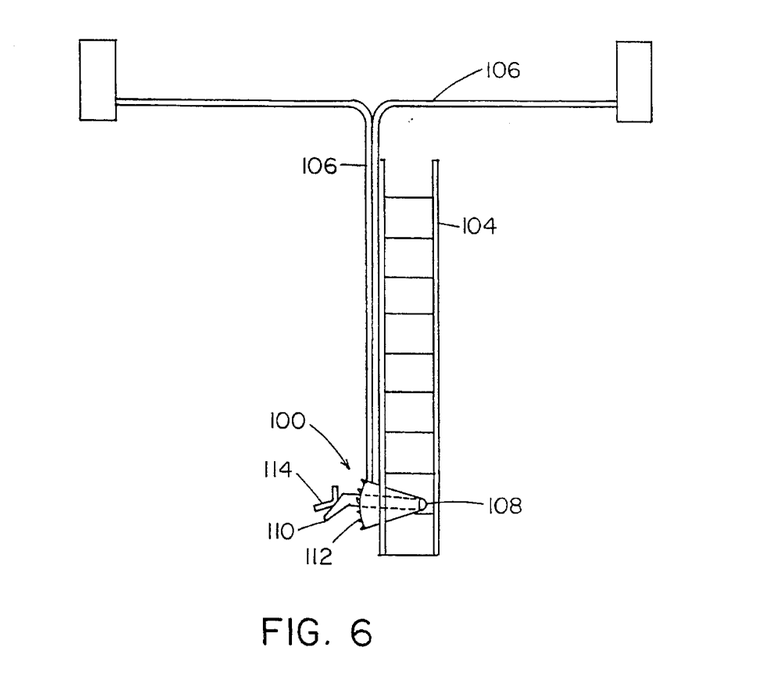
FIG. 6 is an elevational view of the cable maintenance shutdown system and its associated ladder.
Figures 7, 8:
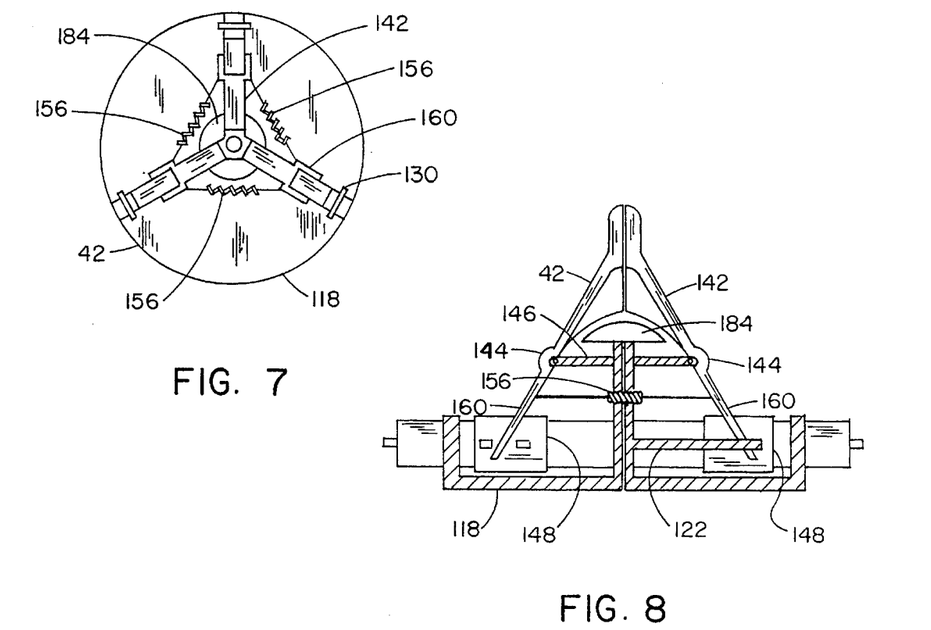
FIG. 7 is an end elevational view of a portion of the pitch control mechanism of FIGS. 2, 8, 9, 10 and 13.
FIG. 8 is a sectional view of the pitch control mechanism shown in FIG. 2 and 7.
Figure 9:
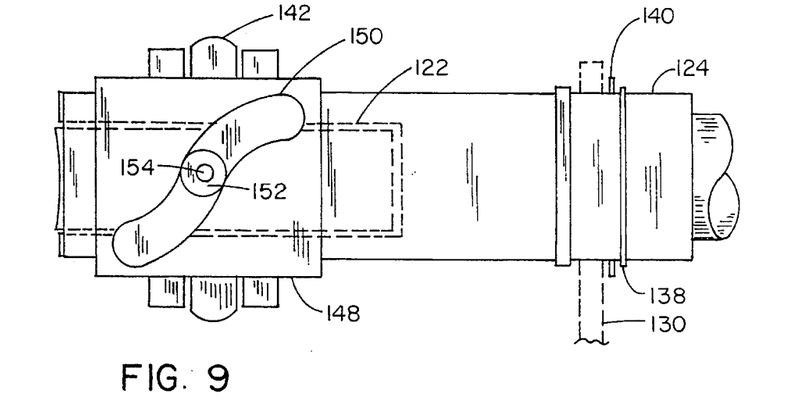
FIG. 9 is a front elevational view of a portion of the pitch control mechanism of FIGS. 7 and 8.
Figure 10:
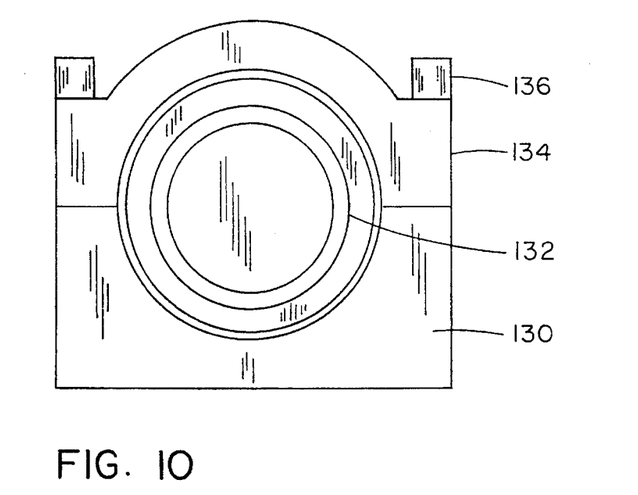
FIG. 10 is a front elevational view of the support bearing for the propeller blades and pitch control mechanism.

The manual cable brake maintenance shutdown system 100 along with its associated ladder 104 are best seen in FIG. 6. Axially shiftable cables 106 are housed in tubes which connect at their upper ends to the braking mechanism 32. A ladder 104 extends down from immediately below the housing 12 to within about four feet of the ground. A pivot pin 108 on the post allows movement of the lever handle 110 at the lower ends of the cables and tubes to concurrently control the movement of the cables 106. The lever handle is simply pulled downward by an operator to apply a force to engage the brakes. A ratchet 112 retains the handle in a proper orientation. A release lever 114 can be tripped against spring to release the ratchet mechanism. This release allows the propellers to spin freely once more. This constitutes a convenient way to stop rotation of the propellers for manual shutdown for maintenance or repair of the machine. The automatic shutdown of the machine is through the aerogovernor 44 which is described in greater detail hereinafter.

Transmission Mechanism

Located between each prop shaft 26 and 28 and its associated electrical shaft 36 and 38 is a transmission mechanism 34. The transmission mechanisms are of similar construction and function in the conventional manner for converting the rotation of one shaft 26 or 28 at one rotational speed into the rotation of an associated shaft 36 or 38 at one of a plurality of different rotational speeds. Any conventional type of transmission mechanism or gear box could readily be utilized. In the preferred embodiment, the utilized transmission mechanism could be either the same as that found in conventional multi-speed bicycles for transferring the rotational speed of the pedals to one of a plurality of speeds of the rear or driving wheel or as found in snow mobiles or combination of both. Such suitable transmission mechanisms are disclosed in U.S. Pat. Nos. 4,599,079; 4,693,700; and 3,747,721. The subject matter of such patents is incorporated herein by reference. The sensing of speed of the driven shaft with respect to the drive shaft is effected by any suitable mechanism such as the torque sensing and converting mechanism described in U.S. Pat. No. 3,747,721. The subject matter of such patent is incorporated herein by reference.

The number of distinct gears in the train and the number of associated trigger points for shifting gears is a matter of choice and design for the particular application. The object of the selection of the transmission, torque sensor and converter as well as the trigger points is to drive the power generator housing and rotor within a preselected range of rotational speeds for maximum efficiency.

Blade Pitch Control Mechanism

FIGS. 7 through 11 illustrate in greater detail the propeller blade pitch mechanisms 42 which cause the pitch of the propeller blades to go from a relatively broad (or nearly perpendicular) angle of incidence during light winds, to a more narrow (or more nearly parallel angle of incidence) during high winds. This is accomplished by centrifugal force via speed of rotation of the propellers and hence also radially outward movement of the outboard ends of the pivot arms 142. The circular support 118 constitutes the framework for supporting the blade pitch control mechanism 42. The axis of the framework support for each propeller is the axis of the prop shafts. Both the framework and the prop shafts are hollow. Bolts couple each framework support 118 to the end of its prop shaft 26 and 28 for supporting the propeller blades 22 and 24. There are three propeller blades 22 on the front or windward side of the housing and three propeller blades 24 on the rear or leeward side. Spinners 62 enclose the propeller blade pitch control mechanisms 42. Coupling between each prop shaft and propeller is through an interior and exterior arm 122 and 124. The interior arm 122 is an integral part of the framework 118. The exterior arm 124 fits over the interior arm. The exterior arm 124 is retained in position by the retainer and shaft support 130, bearing 132, support cap 134, bolts 136, washer 140 and C-shaped retainer clips 138 in circumferential grooves for precluding radial movement of, but allowing rotational movement of, the exterior arm and thereby the propeller blades.

The pivot arms 142, one for each blade 22 or 24, respectively, are pivoted at a central portion 144 of the upper platform 146 of the framework support 118. As increasing centrifugal force is applied by an increasing speed of rotation of the propellers, the pivot arms 142 act to move a spiral sleeve 148 radially inward. Each spiral sleeve 148 is axially slidable on the exterior arm 124 with an S-shaped cutout 150. This inward movement of the spiral sleeve 148, acts against a roller 152 and pin 154 coupled to the exterior arm 124 to rotate the exterior arm 124 and its associated propeller blade 22 or 24 from a broad angle of incidence, at low windspeed, to a trim angle of incidence to the wind in high usable winds. A tension spring 156 modulates the movement of the pivot arms, and returns them to the rest position at low or no wind conditions.

When the aerogovernor hydraulic control mechanisms are activated forcefully by very high wind, a hydraulic cylinder 158 pushes at a prescribed trigger point, the lever 168, push rod 182, mushroom shaped cam 184 of the pivot arms 142 axially inward. This neutralizes rotation by angling the blades endwise so no lift is provided. It also helps to protect the blades upon automatic braking during storm force winds so they are feathered to a relative zero pitch angle (negative angle of incidence).

Figure 13:
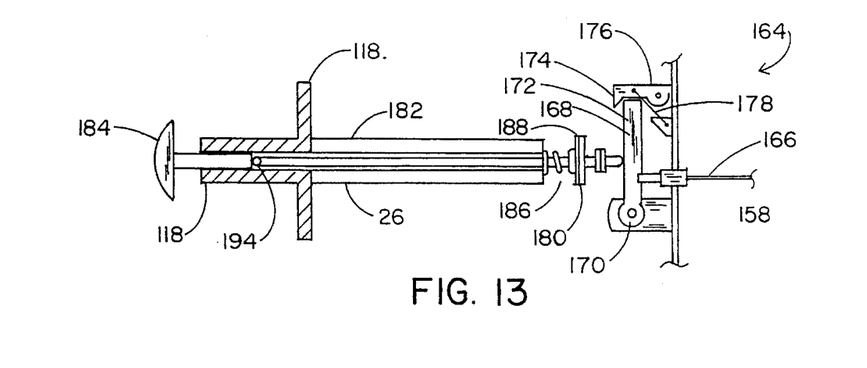
FIG. 13 is a sectional view of the override mechanism for the pitch control mechanism.

Override of the pitch control is by a mechanical override trigger activated by the aerogovernor control 44. (Note FIG. 13.) In very high wind conditions, hydraulic pressure is increased through the action of the aerogovernor 44 as will be described hereinafter. Hydraulic fluid is thereby delivered to the hydraulic cylinder 158 via an oil line 166 to the override trigger assembly 164 and to the braking mechanisms 32. Such increased hydraulic pressure increases the pressure acting against the central portion of a lever 168. The lever rests against a push rod 182 which extends through both the hollow prop shaft 26 and 28 and the hollow pitch control mechanism framework 118 central axis. The lever is pivoted at a first end 170. The opposite end 172 is constrained from movement by a tab 174 at the upper end of a pivot bar 176. The pivot bar 176 is, in turn, constrained from movement by a spring 178. When the hydraulic pressure exceeds a predetermined amount, as determined by an excessivly high wind speed, the pivot bar 176 will be urged outwardly to release the lever 168 to allow the rod 182 to raise the mushroom shaped cam 184 to an elevated position and return the propellers to a zero pitch orientation. A spring 186 resets the trigger after wind speeds are reduced. A thrust washer 180 and cir clip 188 retains the spring 186 on the pushrod 182.

Figure 11:
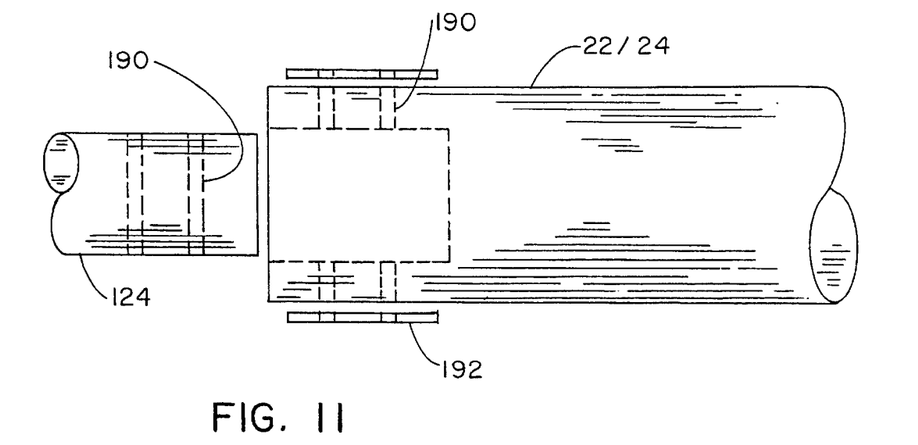
FIG. 11 is a partially exploded view of a portion of the coupling of the propeller blades to the pitch control mechanism.
Figure 12:
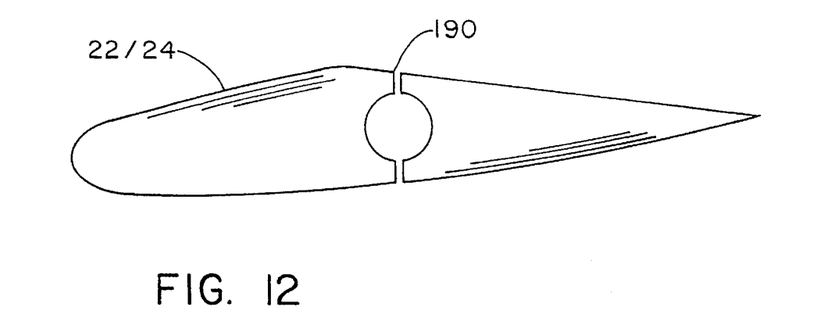
FIG. 12 is a cross-sectional view of one propeller blade.

The propeller blades are most readily seen in FIGS. 11 and 12. The propeller blades root ends 22 or 24 are sized to a pressed fit and hollowed out at the attachment point to the exterior arm 124. Two clamp washers 192 with bolts, not shown, extending through holes 190 retain the composite blades 22 and 24 on the propeller supporting shaft end of the exterior arm 124. The blades are shown in cross-section and are of high efficiency airfoil design as with N.A.C.A. NLF-IV airfoils for general aviation airplane wings. The curvature of the blade is oriented to the lee side of the oncoming wind. Note FIG. 12.

Control Mechanism

Figure 4:
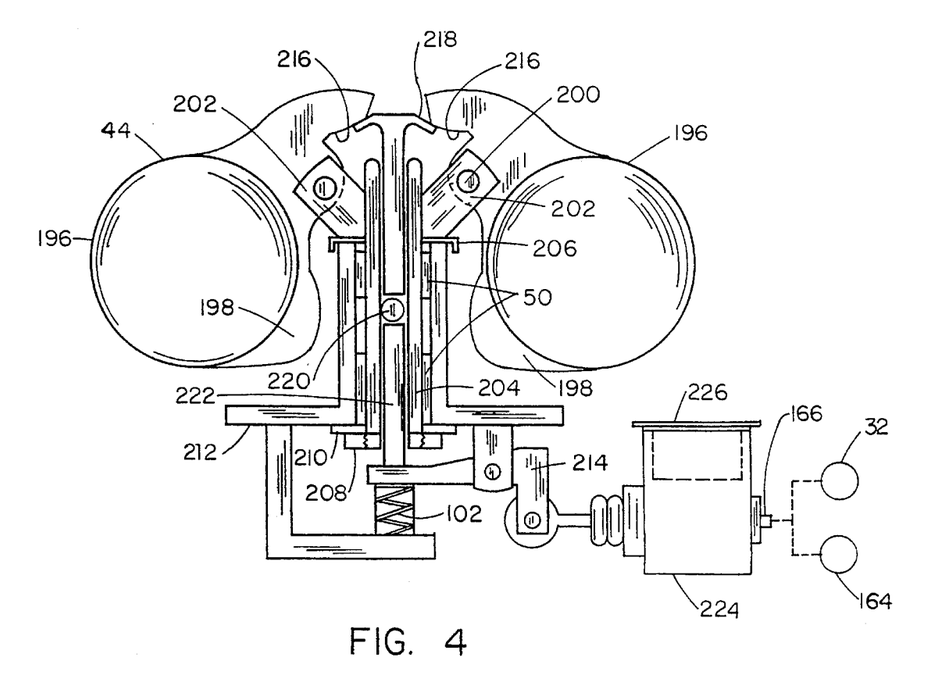
FIG. 4 is a side elevational view, partly in section, of the aerogovernor and a portion of the hydraulic control mechanisms.

The aerogovernor control mechanism 44 is best seen in FIG. 4. Such mechanism includes cups 196 which are attached to weighted governor arms 198 which, in turn, are connected by pivot pins 200 to pivot arms 202. The pivot arms 202 are connected to a hollow shaft 204. A dustcap 206 protects the bearings from the weather. The hollow shaft 204 is retained by a shaft retaining nut 208 and thrust bearing 210 inside the mounting flange 212 and associated support.

A bellcrank 214 is activated when the wind is of sufficiently high velocity to spin the cups 196 and move the weighted governor arms 198 radially outward from the hollow shaft. An upper cam portion 216 of the weighted governor arms presses increasingly on the mushroom shaped cam top 218. This action, in turn, presses downwardly on the steel ball 220, pushrod 222, and bellcrank 214. The purpose of the ball 220 is to reduce torsional stresses on the push rod and minimize friction. This downward movement activates the master cylinder 224 to hydraulically activate the brake mechanisms 32 and the propeller blade pitch override control mechanisms 164 via the fluid lines. The bellcrank spring 102 returns the mushroom cam 218, ball 220, pushrod 222, bellcrank 214 as well as the governor arms 198 to the rest position to a radial inward position when there is light or no wind. A hydraulic cylinder reservoir cap 226 is provided for replenishing the hydraulic fluid. Needle bearings 50 allow free rotation of the aerogovernor shaft 204 within the mounting flange and support 212.

Operation

In operation and use, the machine 10 of the present invention is positioned at a location for receiving wind and converting such wind energy into electrical energy. The movement of the wind is such as to orient the leading or windward end of the machine in the direction of the wind with the rear or leeward end and propeller downstream therefrom. A fin or fins 48 act to maintain and move the housing 12 and propellers 16 and 18 to face directly into the wind by pivoting about the spindle 66 at the upper end of the support post 14. Leeward propeller drag assists this action.

The propellers 16 and 18 are pitched so as to rotate in opposite directions. The rotation of each propeller will rotate its associated prop shaft 26 and 28 through the brake mechanism 32 to rotate the electrical shafts 36 and 38 through the transmission mechanisms 34 for counter rotating the rotor 82 and power generator housing 90. Counter rotation of the rotor and power generator housing, constructed and functioning as an alternator, will create a flow of current which is transmitted through the power pack 228 for distribution through utility lines 20 or used locally on site. The aerogovernor 44 on the top of the housing 12 detects the wind flow and determines its velocity. The velocity of the wind will thus act to regulate the pitch control override mechanisms 164, the brake mechanisms 32 and blade pitch control mechanisms 42 all as a function of the wind speed for maximum efficiency and high velocity wind override protection of the machine. The pitch control 42 and transmission 34 are both separately controlled but both utilize centrifugal force for activation. The alternator 30 employed in the windmill of the instant application is composed of a rotor that has an electromagnetic winding providing constant field to the power generator housing. The power generator housing is composed of multiple coil windings 86 in which electron flow is induced by rotation through lines of magnetic flux from the field rotor. This is an improvement over prior art utilizing generators or single propeller windmills which have non-rotational fixed fields. This wind machine is regulated more so by mechanical means than electrical means (variations in field current). Limitation of rotational speed and pitch of the propellers, braking mechanism, and applying varying the applied load through the transmission to the alternator is the primary mechanical control of the wind machine. Ultimately, the electrical power is produced more efficiently and may be inverted and synchronized to be used in the electrical power system or may be used on site for the particular application intended.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A machine for converting wind energy into electrical energy comprising in combination:

a housing;

propellers of opposite pitch, respectively at the extreme foreward and rearward ends of the housing mounted on separate shafts for rotation upon a common horizontal axis of rotation but separated by the length of the housing;

post means supporting a central extent of the housing for turntable like rotation in a horizontal plane to allow the housing to be oriented parallel to the wind;

an alternator within the housing including a winding part called the power generator housing coupled to the larger diameter propeller's shaft and a field part called the rotor coupled to the smaller diameter propeller's shaft for counter-rotating when the propellers rotate propelled by the wind thereby generating electricity;

coaxial slip ring means in the alternator which in cooperation with spring loaded carbon brushes and wires completes the circuit for transmission of current between the alternator and exterior thereof;

centrifugal pitch control mechanisms located at the extreme outboard end of the propellers for varying the pitch of the propellers as a function of the windspeed to obtain maximal electrical output of the alternator for given wind conditions;

transmission mechanisms for varying the speed of rotation of the rotor and the power generator housing by centrifugal force as a function of the windspeed;

brake mechanisms for proportionately restraining the propellers against over rotation and stoppage in case of excessively high wind;

a protective aerogovernor operatively coupled by hydraulic means to trigger means to over ride pitch control mechanisms for full feathering of the propellers; the brake means are capable of slowing and stopping the propellers in response to excessively high speed of the wind as determined by the aerogovernor; the propeller blade pitch control trigger means over ride mechanism, which is capable of automatic protection of the slowed or stopped and otherwise broad aspect of the propeller blades, functions to turn the propeller blades edgewise or parallel to the wind in high wind speed conditions.

2. The machine as set forth in claim 1 and further including manual control means for energizing the brake mechanisms as for maintenance and repairs.

3. The machine as set forth in claim 1 wherein the control mechanisms includes a transmission mechanism operable in response to the speed of propeller rotation and hence centrifugal force of rotation to proportionally vary the speed of rotation of the rotor and power generator housing and thereby maintain their speeds within a predetermined range.

4. The machine as set forth in claim 1 wherein the leeward propeller is of a larger diameter than the windward propeller and further including a fin or dorsal and ventral stabilizer on the leeward half of the housing in a vertical plane and a support post which couples with the windward half of the housing to allow orientation of the machine into the wind.

5. The machine as set forth in claim 1 wherein the rotor includes a wire receiving direct current from slip ring means and associated conventional spring loaded carbon brushes for generating an electromagnetic field; the power generator housing includes windings for generating alternating current as the windings pass through the electromagnetic field to deliver electrical current through diode means and wires to slip ring means through associated conventional spring loaded brushes to wires completing a circuit from the power generator housing to the power pack where electrical energy can be utilized as intended.

* * * * *